2,842,223

DESICCANT MATERIAL

David M. Zall, Annapolis, Md.

No Drawing. Application December 22, 1955
Serial No. 554,902

1 Claim. (Cl. 183—4)

(Granted under Title 35, U. S. Code (1952), sec. 266)

The invention described herein may be manufactured and used by or for the Government of the United States of America for governmental purposes without the payment of any royalties thereon or therefor.

This invention relates to a sheet-type desiccant, and more particularly to the adhesive retention of moisture adsorbent material, such as silica gel, upon a backing sheet.

Current practice with use of desiccant materials consists of placing particles of a desiccant such as silica gel for example, into a moisture pervious container, usually a fabric bag, closing the bag and then placing said bag in the area where moisture adsorption is desired.

The use of a porous bag as a container for a desiccant material has the disadvantages of providing a very slow rate of adsorption, as well as allowing dust to pass outwardly through the bag with the result that adjacent material may become contaminated with said desiccant material. A further disadvantage in the present technique is that it is difficult to uniformly distribute desiccant material within a package or container. Further the bag containing the desiccant material may be punctured, with a resultant contamination of adjacent material.

An object of this invention is to provide a means for the uniform distribution of a desiccant material over a wide area.

A further object of the invention is to provide a dust-free means of uniformly distributing desiccant material.

Still another object is to provide a sheet-like desiccant carrying means that may be used to form the walls of a container.

Another object is to provide means for the distribution of a desiccant material so that it may be reactivated at a lower temperature than if it were in a bag or the like.

Other objects and many of the attendant advantages of this invention will be readily appreciated as the same becomes better understood by reference to the following detailed description:

The invention consists of a sheet material, as for example either fabric, paper or metal foil having a desiccant material uniformly deposited over either one or both the surfaces, thereof, and fixedly held thereon. Metal foil is preferable in the combination when it is desired that the overall structure have moisture-impervious characteristics.

According to the preferred embodiment of the invention, the desiccant used is silica gel, and it is sprayed or otherwise uniformly distributed onto the surface of the sheet material and held thereon by use of adhesive material having high vapor transmissive qualities. It is pointed out that clay-type and alumina desiccant can be used instead of silica gel. A starch base glue is an example of an adhesive having high vapor transmissive qualities.

It is pointed out that adhesives other than those of the class set forth above could readily be utilized. However, since a certain portion of the desiccant may become completely or partially covered with adhesive on being sprayed or otherwise affixed to a backing sheet, it is preferable to use an adhesive having high vapor transmissive characteristics, so as to allow the desiccant material to absorb moisture though it may be partially or wholly covered by adhesive.

A modified form of the invention consists of a desiccant coated sheet material of the type described above that is provided with a series of perforations so that it may be torn into smaller sections when the use therefor so requires.

The application of desiccant material to sheet-like members, in the manner set forth above, need not be limited to flat, smooth surfaces, since it can just as readily be applied to a corrugated sheet. Such an arrangement would be desirable where it is necessary to provide a sheet-like member that has better than average resistance to bending. One such application, for example, is in the walls of a corrugated paper box. Another use for such a corrugated material is in a filter device comprising a perforated container having a sheet of said corrugated material rolled-up or folded-up therein, so that the entire device may be used as a filter for the dehydration of gases, etc., the latter being passed through said container.

A further modification of the invention consists of a backing sheet of metal for a moisture-impervious structure, paper or the like provided with a substantial number of depressions in the surface thereof and having the dessicant material deposited and adhesively held in said depressions, thereby providing a honey-comb-like effect.

It is pointed out that a vapor corrosion inhibitor of low vapor pressure may be incorporated in the desiccant material before the latter is applied to a backing member.

Obviously many modifications and variations of the present invention are possible in the light of the above teachings. It is therefore to be understood that within the scope of the appended claim the invention may be practiced otherwise than as specifically described.

What is claimed is:

A moisture adsorbent article of the class described, comprising a moisture-impervious sheet of metal foil having finely divided silica gel adhesively affixed on a surface thereof, said silica gel being held on said sheet by means of a starch base, moisture transmissive adhesive.

References Cited in the file of this patent

UNITED STATES PATENTS

| | | |
|---|---|---|
| 1,482,626 | Whiting | Feb. 5, 1924 |
| 2,336,456 | Anderegg | Dec. 14, 1943 |
| 2,537,992 | Gross et al. | Jan. 16, 1951 |
| 2,593,146 | Howard | Apr. 15, 1952 |
| 2,597,872 | Iler | May 27, 1952 |
| 2,638,179 | Yard | May 12, 1953 |